US010668876B2

United States Patent
Ando et al.

(10) Patent No.: US 10,668,876 B2
(45) Date of Patent: Jun. 2, 2020

(54) IN-VEHICLE NETWORK SYSTEM

(71) Applicant: TOYOTA JIDOSHA KABUSHIKI KAISHA, Toyota-shi, Aichi-ken (JP)

(72) Inventors: Hiroya Ando, Toyota (JP); Shu Ishizuka, Toyota (JP); Taichi Matsumura, Toyota (JP); Masashi Amesara, Toyota (JP); Yutaka Ueda, Yokkaichi (JP); Yoshifumi Ohmori, Nagoya (JP); Toshio Kawamura, Nagakute (JP); Tomomi Kawamura, Nagakute (JP); Toshio Shimada, Nagoya (JP); Yoshiroh Hirata, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 212 days.

(21) Appl. No.: 15/728,943

(22) Filed: Oct. 10, 2017

(65) Prior Publication Data
US 2018/0126930 A1 May 10, 2018

(30) Foreign Application Priority Data
Nov. 4, 2016 (JP) .................................. 2016-216624

(51) Int. Cl.
*B60R 16/023* (2006.01)
*H04L 29/08* (2006.01)
(Continued)

(52) U.S. Cl.
CPC .... *B60R 16/0231* (2013.01); *H04L 12/40143* (2013.01); *H04L 12/4625* (2013.01);
(Continued)

(58) Field of Classification Search
None
See application file for complete search history.

(56) References Cited

U.S. PATENT DOCUMENTS

| 2003/0156595 A1* | 8/2003 | Kishigami | .............. H04L 12/66 |
| | | | 370/445 |
| 2008/0036577 A1* | 2/2008 | Natsume | ............... B60W 50/14 |
| | | | 340/425.5 |

(Continued)

FOREIGN PATENT DOCUMENTS

| JP | 2003-218925 A | 7/2003 |
| JP | 2003198574 A | 7/2003 |

(Continued)

*Primary Examiner* — Pinping Sun
(74) *Attorney, Agent, or Firm* — Hunton Andrews Kurth LLP (57) ABSTRACT

An in-vehicle network system includes a plurality of controllers; a plurality of communication lines connected to the controllers, respectively, a relay device connected to the controllers via the communication lines, and a retention determiner configured to determine whether retention of data occurs in the relay device. The relay device is configured to relay data between the communication lines, and configured to preferentially relay data having a priority equal to or higher than a predetermined priority such that the data reaches the controller that is a transmission destination among the controllers within a first predetermined time when the retention determiner determines that the retention occurs.

12 Claims, 6 Drawing Sheets

(51) Int. Cl.
*H04L 12/40* (2006.01)
*H04L 12/46* (2006.01)
*H04L 12/851* (2013.01)
*H04L 12/911* (2013.01)

(52) U.S. Cl.
CPC .............. *H04L 47/24* (2013.01); *H04L 67/12* (2013.01); *H04L 67/322* (2013.01); *H04L 47/821* (2013.01); *H04L 2012/40273* (2013.01)

(56) References Cited

U.S. PATENT DOCUMENTS

| | | | | |
|---|---|---|---|---|
| 2010/0131816 | A1* | 5/2010 | Yamamoto | H04L 12/4013 714/749 |
| 2012/0307836 | A1* | 12/2012 | Ishigooka | H04L 12/4625 370/401 |
| 2016/0359545 | A1* | 12/2016 | Kodama | H04L 12/407 |
| 2016/0371077 | A1* | 12/2016 | Moeller | H04L 67/12 |

FOREIGN PATENT DOCUMENTS

| | | | |
|---|---|---|---|
| JP | 2009089286 A | * | 4/2009 |
| JP | 2009089286 A | | 4/2009 |
| JP | 2015-154185 A | | 8/2015 |

\* cited by examiner

| TYPE OF DATA | PRIORITY |
|---|---|
| ENGINE SPEED | HIGH |
| DEGREE OF THROTTLE OPENING | HIGH |
| STEERING ANGLE | HIGH |
| MASTER CYLINDER PRESSURE | HIGH |
| . . . | . . . |
| SET TEMPERATURE OF AIR CONDITIONER | MEDIUM |
| DRIVE RECORDER | MEDIUM |
| . . . | . . . |
| OPENING AND CLOSING OF DOOR | LOW |
| ELECTRONIC LOCK | LOW |
| OPENING AND CLOSING OF POWER WINDOW | LOW |
| . . . | . . . |

IN-VEHICLE NETWORK SYSTEM

INCORPORATION BY REFERENCE

The disclosure of Japanese Patent Application No. 2016-216624 filed on Nov. 4, 2016 including the specification, drawings and abstract is incorporated herein by reference in its entirety.

BACKGROUND

1. Technical Field

The present disclosure relates to an in-vehicle network system.

2. Description of Related Art

In the related art, there is a communication bandwidth management system in which a plurality of communication devices provided in a communication path between a user terminal and a server transmits information indicating a communication bandwidth allocatable to each communication path to a management device corresponding to a sub-network including each communication path at the time of start of communication between the user terminal and the server, the management device transmits the information indicating the allocatable communication bandwidth received from the communication device to an integrated management device, the integrated management device sets the narrowest communication bandwidth among bandwidths indicated by the information indicating the allocatable communication bandwidth as an allocated communication bandwidth and transmits the allocated communication bandwidth to each communication device via the management device, and each communication device performs communication using the same common communication bandwidth according to the allocated communication bandwidth (for example, see Japanese Unexamined Patent Application Publication No. 2003-218925 (JP 2003-218925 A)).

SUMMARY

In a communication bandwidth management system of the related art, since a communication device can perform communication in the same common communication bandwidth, data is retained in the communication device when there is a large amount of data, and transfer of data to a communication device, a user terminal, or a server that is a transmission destination is likely to be delayed.

The communication bandwidth management system of the related art is not mounted on a vehicle, and countermeasure against the delay of transfer of data is not particularly performed. However, when the communication bandwidth management system is mounted on the vehicle, the delay of transfer of data is likely to lead to delay of control of the vehicle, and a countermeasure is needed to be taken.

The present disclosure provides an in-vehicle network system capable of preventing both retention of transfer data and delay of transfer of data.

An aspect of the present disclosure relates to an in-vehicle network system including: a plurality of controllers; a plurality of communication lines connected to the controllers, respectively; a relay device connected to the controllers via the communication lines; and a retention determiner configured to determine whether retention of data occurs in the relay device. The relay device is configured to relay data between the communication lines, and configured to preferentially relay data having a priority equal to or higher than a predetermined priority such that the data reaches the controller that is a transmission destination among the controllers within a first predetermined time when the retention determiner that determines the retention occurs.

According to the aspect of the present disclosure, it is possible to prevent retention of the data having a priority equal to or higher than a predetermined priority among the data to be transferred from the controller to another controller via the relay device, and relay is performed such that the data having a priority higher than a predetermined priority reaches the controller that is a transfer destination (a transmission destination) within a predetermined time.

Thus, it is possible to provide an in-vehicle network system capable of preventing both retention of transfer data and delay of transfer of data.

In the in-vehicle network system according to the aspect, the relay device may be configured to preferentially relay the data having a priority equal to or higher than a predetermined priority to the controller that is a transmission destination for a first time shorter than the first predetermined time when the retention determiner determines that the retention occurs.

According to the aspect of the present disclosure, since the data having a priority equal to or higher than a predetermined priority is preferentially relayed for the first time shorter than the first predetermined time, the data having the priority higher than the predetermined priority can reach the controller that is a transfer destination (a transmission destination) within a predetermined time.

Thus, it is possible to provide an in-vehicle network system capable of allowing data having a priority higher than a predetermined priority to reliably reach a transfer destination while preventing retention of transfer data.

In the in-vehicle network system according to the aspect, the relay device may be configured to extend the first time to a second time shorter than the first predetermined time and longer than the first time when the retention determiner determines that the retention occurs at the time of elapse of the first time.

According to the aspect of the present disclosure, in a case where the data having the priority higher than the predetermined priority cannot be transferred within the first time, since the first time is extended to the second time shorter than the first predetermined time, it is possible to allow the data having the priority higher than the predetermined priority, which has not been transferred, to reach a controller that is a transfer destination (a transmission destination) within a predetermined time.

Thus, it is possible to provide an in-vehicle network system capable of allowing data having a priority higher than a predetermined priority to reliably reach a transfer destination while preventing retention of transfer data.

In the in-vehicle network system according to the aspect, the relay device may be configured to extend the second time to a third time shorter than the first predetermined time and longer than the second time when the retention determiner determines that the retention occurs at the time of elapse of the second time.

According to the aspect of the present disclosure, in a case where the data having the priority higher than the predetermined priority cannot be transferred within the second time, since the second time is also extended to the third time shorter than the first predetermined time, it is possible to allow the data having the priority higher than the predetermined priority, which has not been transferred, to reach a controller that is a transfer destination (a transmission destination) within a predetermined time.

Thus, it is possible to provide an in-vehicle network system capable of allowing data having a priority higher than a predetermined priority to reliably reach a transfer destination while preventing retention of transfer data.

In the in-vehicle network system according to the aspect, the retention determiner may be configured to determine whether retention of the data occurs according to whether the number of pieces of the data retained in the relay device is equal to or greater than a predetermined number or whether a time for which the data is retained in the relay device is equal to or longer than a second predetermined time. The relay device may be configured to preferentially relay the data having a priority equal to or higher than a predetermined priority when the number of pieces of the data retained in the relay device is equal to or greater than the predetermined number or when the time for which the data is retained is equal to or longer than a second predetermined time.

According to the aspect of the present disclosure, it is possible to reliably determine the number of pieces of data retained in the relay device, or whether data is retained in a retention time.

Thus, it is possible to provide an in-vehicle network system capable of reliably determining whether there is retention, and allowing data having a priority higher than a predetermined priority to more reliably reach a transfer destination while more effectively preventing retention of transfer data based on a result of the determination.

In the in-vehicle network system according to the aspect, the relay device may include a buffer that stores the data.

In the in-vehicle network system according to the aspect, the retention determiner may be configured to determine whether the retention of the data occurs by detecting a free space of the buffer.

In the in-vehicle network system according to the aspect, the relay device may be configured to relay data having a priority lower than a predetermined priority after the relay device preferentially relays the data having a priority equal to or higher than the predetermined priority.

According to the aspect of the present disclosure, since the data having a priority lower than a predetermined priority is relayed after the data having a priority higher than the predetermined priority is preferentially relayed, it is possible to reliably send the data having a priority lower than a predetermined priority to a transfer destination.

Accordingly, it is possible to also provide an in-vehicle network system capable of allowing the data having a priority lower than a predetermined priority to reach a transfer destination.

In the in-vehicle network system according to the aspect, the first predetermined time may be a time that is needed for control of a vehicle.

According to the aspect of the present disclosure, the data having a priority higher than the predetermined priority can be transferred in time for control of a vehicle.

Thus, it is possible to provide an in-vehicle network system capable of preventing both retention of transfer data and delay of transfer of data in consideration of the control of the vehicle.

In the in-vehicle network system according to the aspect, the priority of the data may include three steps of high, medium, and low, and the priority of the data associated with travel of the vehicle may be high.

In the in-vehicle network system according to the aspect, a priority of data of a drive recorder or data indicating a set temperature of an air conditioner may be medium; and a priority of data indicating opening and closing of a power window, unlocking and locking of an electronic lock, and opening and closing of a door may be low.

In the in-vehicle network system according to the aspect, the priority of the data may be set after a header area of a data frame and before a data area of the data frame.

According to the aspect of the present disclosure, it is possible to provide an in-vehicle network system capable of preventing both retention of transfer data and delay of transfer of data.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment to which an in-vehicle network system of the present disclosure is applied will be described.

Embodiment

Figure 1:
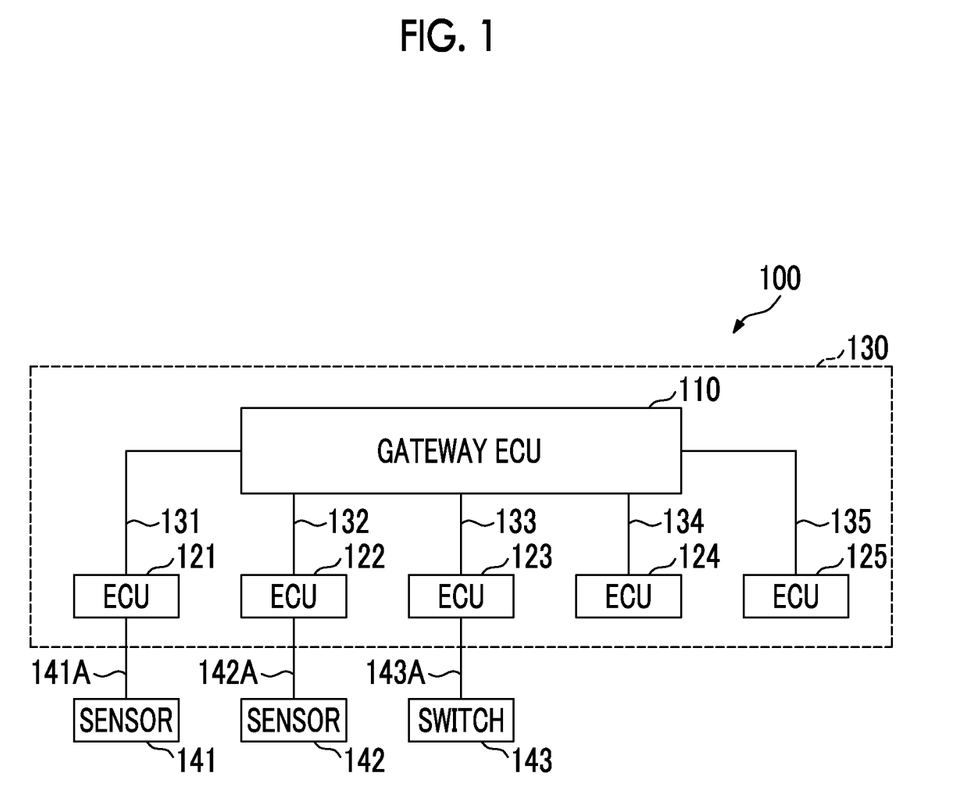
FIG. 1 is a diagram illustrating an in-vehicle network system according to an embodiment.

FIG. 1 is a diagram illustrating an in-vehicle network system 100 according to an embodiment. The in-vehicle network system 100 is mounted on a vehicle.

The in-vehicle network system 100 includes a gateway electronic control unit (ECU) 110, ECUs 121, 122, 123, 124, 125, and a plurality of communication lines 131, 132, 133, 134, 135. Further, sensor 141, 142 are connected to the ECUs 121, 122 through wires 141A, 142A, respectively. A switch 143 is connected to the ECU 123 via a wire 143A.

The in-vehicle network system 100 uses, for example, an Ethernet protocol as a communication protocol. The communication lines 131 to 135 do not indicate physical buses, and are virtual communication lines that build a virtual local area network (VLAN) 130 according to the Ethernet protocol. Further, the wires 141A, 142A, 143A are physical cables.

The VLAN 130 is built by the communication lines 131 to 135, and the gateway ECU 110 and the ECUs 121 to 125 are connected to the VLAN 130. Here, for example, the communication lines 131 to 135 are communication lines corresponding to the Ethernet standard. The communication lines 131 to 135 are an example of a plurality of communication lines. Here, for example, an aspect in which the communication lines 131 to 135 are included in the VLAN 130 will be described, but the communication lines 131 to 135 may be grouped into a plurality of the VLANs.

The gateway ECU 110 is realized by, for example, a computer including a central processing unit (CPU), a random access memory (RAM), a read only memory (ROM), a clock generator, an input and output interface, a communication interface, a transmitter and receiver, and an internal bus.

The gateway ECU 110 includes, for example, five ports, and the ECUs 121 to 125 are connected to the five ports through the communication lines 131 to 135, respectively. The gateway ECU 110 is a network relay device that relays data input to any one of ports to another port. The gateway ECU 110 is an example of a relay device. The ports of the gateway ECU 110 are not physical ports and are virtual ports. Any number of virtual ports may be provided as long as there is a plurality of virtual ports.

The gateway ECU 110 performs, for example, a data transfer process using an L7 switch. Such a gateway ECU 110 can be regarded as a hub ECU. Here, the L7 switch is a switch that performs a data transfer process by checking an application-level protocol (usage protocol) information corresponding to layer 7 (application layer) of an Open Systems Interconnection (OSI) reference model. The L7 switch performs switching in software.

The ECUs 121 to 125 are examples of a plurality of controllers that perform various control of the vehicle. Each of the ECUs 121 to 125 is realized by, for example, a computer including a CPU, a RAM, a ROM, a clock generator, an input and output interface, a communication interface, a transmitter and receiver, and an internal bus.

Each of the ECUs 121 to 125 is any one of various types of ECUs, such as an engine ECU, a brake ECU, a steering ECU, a transmission ECU, a body ECU, a meter ECU, an air conditioner ECU, a Pre-Crash Safety (PCS)-ECU, or a Lane Keeping Assist (LKA)-ECU.

In FIG. 1, for example, sensors 141, 142 are connected to the ECUs 121, 122, respectively, and the switch 143 is connected to the ECU 123. The sensors 141, 142 are, for example, various sensors that are mounted on a vehicle, such as a vehicle speed sensor, a shift position sensor, and a steering angle sensor. Further, the switch is, for example, any switch connected to the ECU, such as an ignition switch. Such a sensor or switch may also be connected to the ECU 124 or 125.

In the case of a hybrid vehicle (HV), an electric vehicle (EV), and a fuel cell vehicle (FCV), an HV-ECU that controls output of the engine or a driving motor, and an EV-ECU that controls output of the driving motor may be used instead of the engine ECU. Types of ECUs corresponding to the ECUs 121 to 125 differ according to a power source (engine, HV, EV, FCV, or the like) of the vehicle.

The communication lines 131 to 135 are virtual communication lines that build the VLAN 130 according to the Ethernet protocol, as described above. The gateway ECU 110 and the ECUs 121 to 125 are connected to each other by a physical bus (not illustrated), and the VLAN 130 is realized in the physical bus.

Figure 2:
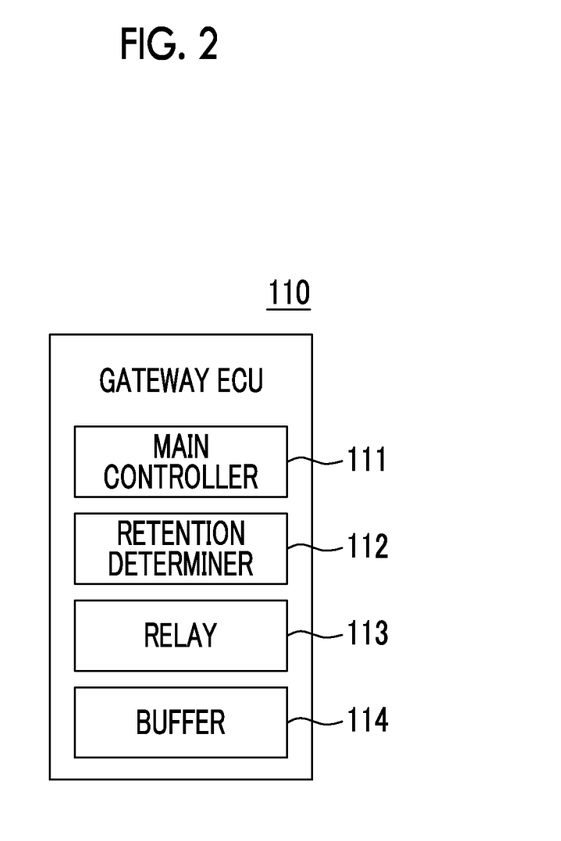
FIG. 2 is a diagram illustrating functional blocks of a gateway ECU.

FIG. 2 is a diagram illustrating a functional block of the gateway ECU 110.

The gateway ECU 110 includes a main controller 111, a retention determiner 112, a relay 113, and a buffer 114.

The main controller 111 is a controller that controls an entire process of the gateway ECU 110. The main controller 111 performs a process of the gateway ECU 110 other than processes performed by the retention determiner 112 and the relay 113. The process executed by the main controller 111 will be described below with reference to a flowchart of FIG. 6A and FIG. 6B. Further, the main controller 111 includes a counter for counting a time for performing a transmission process when data having a relatively high priority is preferentially transmitted from the buffer 114 in a preferential relay process that will be described below.

The retention determiner 112 determines whether retention of data occurs in the gateway ECU 110. The retention determiner 112 determines whether the retention of the data occurs according to whether the number of pieces of data stored in the buffer 114 is equal to or greater than five. Here, for example, the retention of data in the gateway ECU 110 refers to there being five or more pieces of data waiting to be transferred in the buffer 114. The retention determiner 112 detects the number of pieces of data, for example, by counting the number of identifiers (IDs) of data stored in the buffer 114.

The relay 113 is a relay that relays data among the communication lines 131 to 135. When the retention determiner 112 determines that retention of data is occurring, the relay 113 preferentially relays data of which priority is equal to or higher than a predetermined priority such that the data reaches the ECU that is a transmission destination among the ECUs 121 to 125 (any one of 121 to 125) within a predetermined time. Thus, a process of preferentially relaying the data of which priority is equal to or higher than the predetermined priority is referred to as a preferential relay process. The predetermined time is an example of a first predetermined time, and is a time set not to affect various controls of the vehicle.

Here, for example, it is assumed that the priority of data is set to three levels (high, medium, and low). Further, the predetermined priority is a "medium" priority. That is, in the preferential relay process, data having a "high" priority and a "medium" priority are relayed preferentially.

When the relay 113 performs the preferential relay process according to the priority, the relay 113 first relays data having a high priority among the retention of data in the buffer 114, and then relays data having a medium priority. When the data having a high priority and the data having a medium priority are not stored in the buffer 114, the relay 113 relays data having a low priority. The relay 113 sets a value of a flag to "1" when the relay 113 performs the preferential relay process, and sets the value of the flag to "0" when the relay 113 does not perform the preferential relay process.

The buffer 114 is a RAM of the gateway ECU 110, and is a memory or a data holder that receives data that is relayed among the ECUs 121 to 125 from the communication lines 131 to 135, and temporally holds the data until the memory or the data holder outputs the data to the communication line (any one or a plurality of the communication lines of 131 to 135) connected to the ECU (any one or a plurality of ECUs other than a transmission source among 121 to 125) that is a transmission destination.

Figure 3:
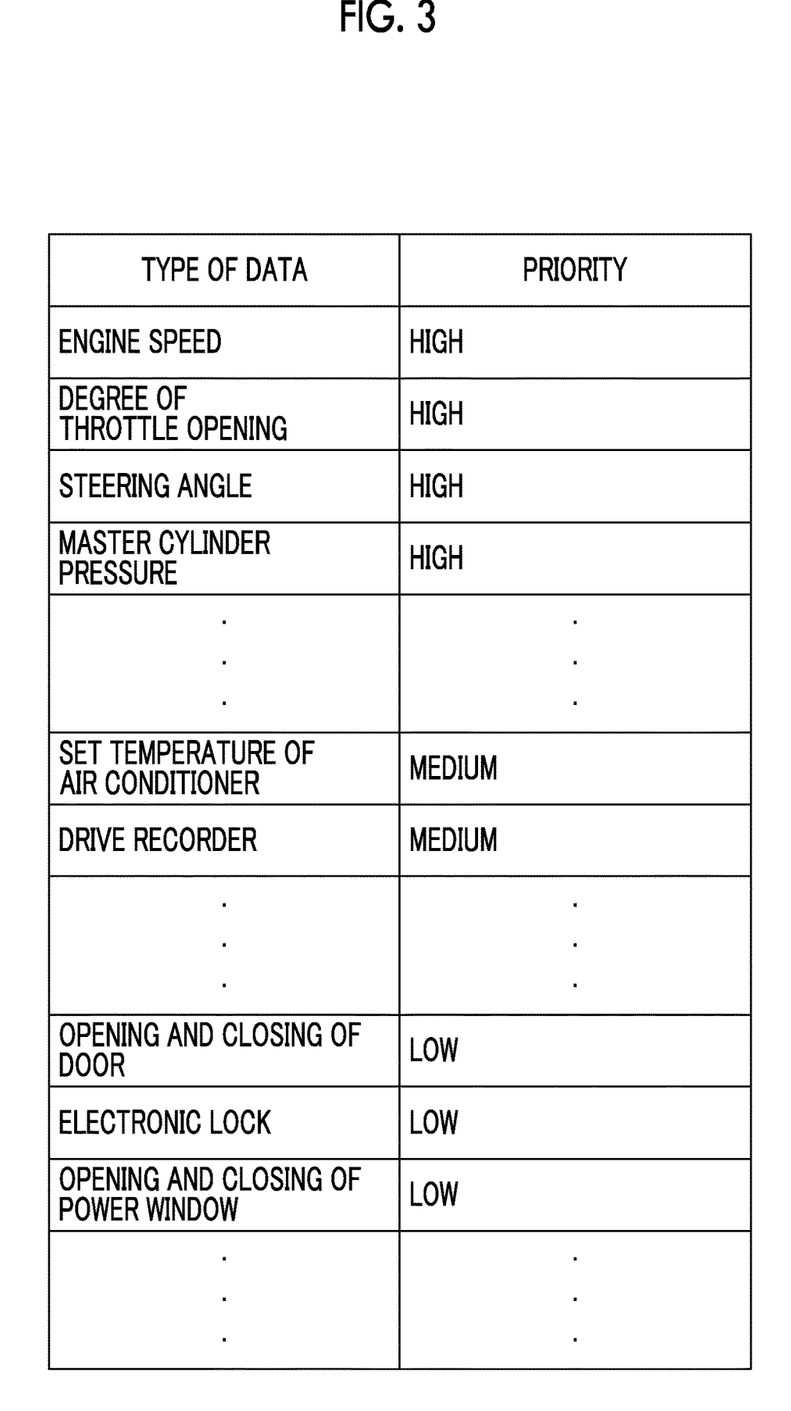
FIG. 3 is a diagram illustrating data in a table format indicating a priority of data.

FIG. 3 is a diagram illustrating data in a table format indicating a priority of data. The data in the table format illustrated in FIG. 3 is stored in, for example, an internal memory of the gateway ECU 110, such as a ROM.

The data in the table format illustrated in FIG. 3 is transferred by the communication lines 131 to 135, and indicates a relationship between the type of data regarding control of the vehicle that is used in the ECUs 121 to 125, and the priority. The data regarding the control of the vehicle is, for example, data that is detected by the sensors 141, 142 or data that is input to the switch 143, and is acquired by the ECUs 121 to 123 and transferred to the gateway ECU 110.

For example, a priority of data related to travel of the vehicle such as running, turning, and stopping of the vehicle, such as an engine speed, a degree of throttle opening, a steering angle, or master cylinder pressure, is set to "high" that is a highest step among three steps (high, medium, and low).

Further, for example, since data of a drive recorder or data indicating a set temperature of an air conditioner is not data directly related to travel of the vehicle, the priority is set to "medium" that is a medium level.

Further, for example, since data indicating opening and closing of a power window, unlocking and locking of an electronic lock, or opening and closing of a door is not data directly related to travel of the vehicle and is considered to have a lower priority than the data of the drive recorder or the data indicating the set temperature of the air conditioner, the priority is set to "low" that indicates a lowest priority.

The in-vehicle network system 100 according to the embodiment stores data in a table format indicating a relationship between a type of data regarding control of the vehicle and the priority as illustrated in FIG. 3 in an internal memory, and the main controller 111 reads the data, as needed.

Figure 4:
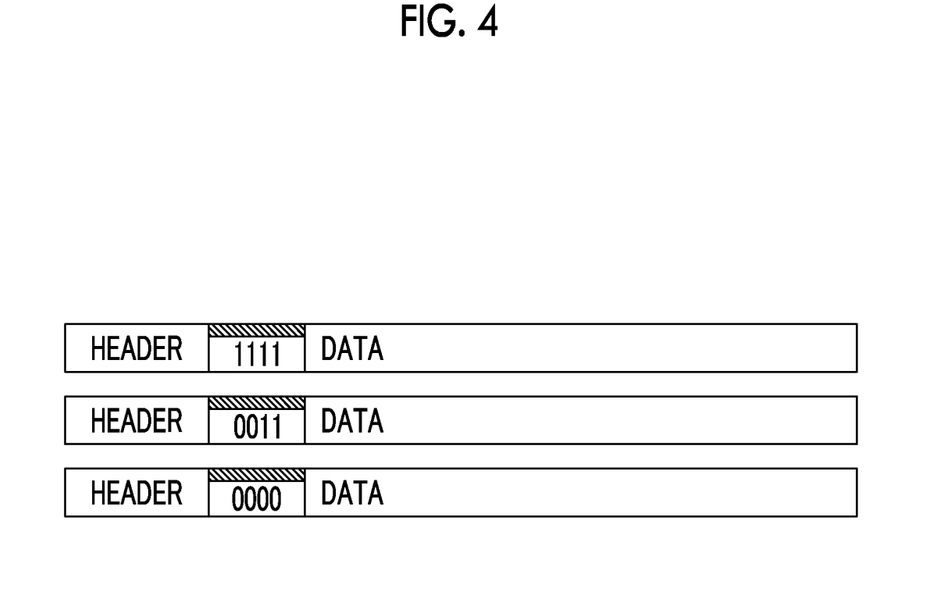
FIG. 4 is a diagram illustrating a frame that is used by the in-vehicle network system.

FIG. 4 is a diagram illustrating a frame that is used by the in-vehicle network system 100. Here, for example, an Ethernet frame is schematically illustrated. In FIG. 3, for convenience of description, the priority of data is indicated as high, medium, and low, but is represented by, for example, a value of 4 bits in the frame.

As illustrated in FIG. 4, the value indicating the priority is written after a header of the frame and before the data. As illustrated in FIG. 4, a value indicating a highest priority "high" (hereinafter, a high priority) is "1111", a value indicating a medium priority "medium" (hereinafter, a medium priority) is "0011", and a value indicating a lowest priority "low" (hereinafter, a low priority) is "0000". A form in which the priority is represented by 4 bits is described herein, but three levels of priority can be represented as long as the priority is represented by 2 bits or more.

Figure 5:
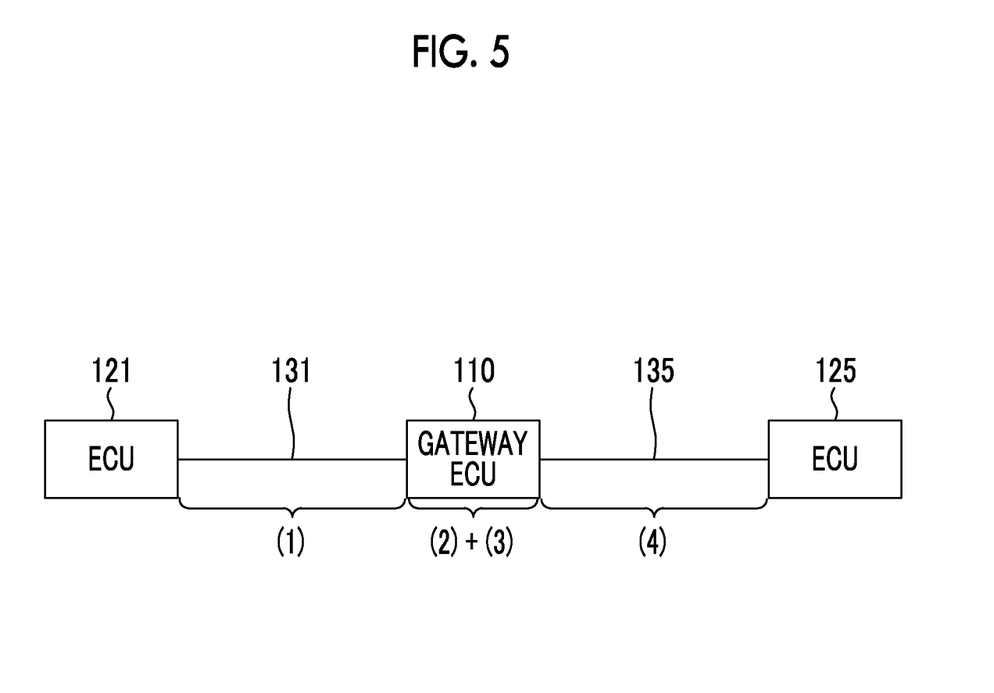
FIG. 5 is a diagram illustrating a time needed for data transfer.

FIG. 5 is a diagram illustrating a time needed for data transfer. Data transfer among the ECU 121, the gateway ECU 110, and the ECU 125 will be described by way of example herein. The same applies to a case where data is transferred via the gateway ECU 110 among the ECUs 121 to 125.

A time taken for the data transmitted from the ECU 121 to be received by the ECU 125 via the gateway ECU 110 is a total time obtained by summing the following times (1) to (4) (period). Hereinafter, the total time is referred to as a transfer time. (1) A time from the transmission of the ECU 121 to the reception of the gateway ECU 110. (2) A time (relay time) needed until data received by the gateway ECU 110 is transmitted in a state in which there is no retention. (3) A relay time that increases due to occurrence of retention of data. (4) A time from the transmission of the gateway ECU 110 to the reception of the ECU 125.

The times (1) and (4) depend on a communication speed of the in-vehicle network system 100 or a length (amount) of the data. For example, it is assumed that each of the times (1) and (4) in a case where data of 1500 bytes is transmitted in a 100 Mbps Ethernet is 1 ms (milliseconds).

In this case, a 1-bit length is 10 ns (nanoseconds), and a length of one piece of data is 10 ns×1500×8=120 µs (microseconds). When a time needed for, for example, reading of a header area in a physical layer (L1) or an MAC layer (L2) and a time needed for retransmission in the case of collision between data are considered, the times (1) and (4) for one piece of data are 1 ms.

Further, the time (2) depends on performance of the gateway ECU 110, but the time (2) is assumed to be 10 ms (milliseconds). The gateway ECU 110 determines whether there are five or more pieces of data in the buffer 114 when determining whether retention of data occurs in the buffer 114. That is, when the number of pieces of data in the buffer 114 is four or less, the gateway ECU 110 determines that the retention of data has not occurred and transmits the data in the buffer 114 sequentially (sequentially from oldest data) to the ECU (any one of 121 to 125) that is a transmission destination regardless of the priority without performing the preferential relay process. Thus, a relay time of the time (2) is set to 10 ms in consideration of a certain margin time as the time needed for a process of sequentially transmitting (relaying) the four pieces of data in the buffer 114.

Further, the time (3) is zero seconds when no retention has occurred, but increases with a degree of retention when the retention occurs. That is, the time (3) greatly varies according to a state (traffic) of the network (the communication lines 131 to 135). Further, when the retention occurs, the relay 113 of the gateway ECU 110 preferentially transmits data having a priority higher than a predetermined priority, and therefore, the time (3) varies according to the number of pieces of data in the buffer 114 and the priority.

Here, for example, the relay time (total value of time (2)+time (3)) when the retention is occurring is obtained under the following conditions. The conditions are that there are three types of priorities of data, and a ratio of high priority data, medium priority data, and low priority data is approximately 1:1:1. Further, from the viewpoint of designing traffic of the network, the number of pieces of data retained in the buffer 114 is assumed to be 50 at most.

The time (3) is longest when the data retained in the buffer 114 is transmitted to one ECU (for example, the ECU 125). In other words, the time (3) becomes longest when all destinations of the 50 pieces of data retained in the buffer 114 indicate one ECU (for example, the ECU 125). When 1 ms is needed to transmit one piece of data from the buffer 114 to the communication lines (131 to 135) inside the gateway ECU 110, the time (3) takes 50 ms until the last (50th) data is transmitted.

For the sake of comparison, three cases including a case where no retention of data occurs in the buffer 114, a case where retention of data occurs in the buffer 114 and the relay 113 does not perform the preferential relay process according to the priority, and a case where retention of data occurs in the buffer 114 and the relay 113 performs a preferential relay process will be described herein.

In a case where no retention of data occurs in the buffer 114, the transfer time (total time of time (1) to (4)) is 12 ms. The time (3) is zero seconds.

In a case where retention of data occurs in the buffer 114 and the relay 113 does not perform the preferential relay process, when all of destinations of 50 pieces of data retained in the buffer 114 indicate one ECU (for example, the ECU 125), the time (3) becomes longest and becomes 50 ms, and therefore, the transfer time becomes 62 ms.

In a case where retention of data occurs in the buffer 114 and the relay 113 performs a preferential relay process, the retention data is transmitted in order of a high priority, a medium priority, and a low priority.

When the number of pieces of the data having a high priority is 17 among 50, the transfer time becomes 29 ms that is obtained by adding 12 ms that is a total time obtained by summing the times (1), (2), and (4) to 17 ms of the time (3).

Further, when the number of pieces of data having a medium priority retained in the buffer 114 is assumed to be 17 among 50, the time (3) is a time for 17 pieces of data having a medium priority after a time (3) for 17 pieces of data having a high priority, and therefore, the time (3) becomes 34 ms for 17th data having a medium priority. Therefore, the transfer time becomes 46 ms obtained by adding 12 ms that is a total time obtained by summing the times (1), (2), and (4) to 34 ms of the time (3).

Further, when the number of pieces of low-priority data retained in the buffer 114 is 16 among 50, the time (3) is a time for 16 pieces of data having a low priority after the time (3) for 34 pieces of data having a high priority and a medium priority, and therefore, the time (3) becomes 50 ms for 50th data having a low priority. Therefore, the transfer time becomes 62 ms obtained by adding 12 ms that is a total time obtained by summing times (1), (2), and (4) to 50 ms of the time (3).

When the data having a high priority or a medium priority is preferentially transmitted from the buffer 114 in the preferential relay process, the gateway ECU 110 receives the data, and when a large number of pieces of data having a high priority or a medium priority are stored in the buffer 114, a transfer time of the data having a medium priority or a low priority is further extended.

Since the transfer time of the data in the in-vehicle network system 100 is the time as described above, the predetermined time when the data is preferentially relayed is, for example, 35 ms such that the relay 113 performs the preferential relay process and the data having a high priority or a medium priority reaches the ECU (any one of 121 to 125) that is a transmission destination within a predetermined time.

The predetermined time of 35 ms is set in consideration of it taking 29 ms to transfer all the 17 pieces of data having a high priority when 50 pieces of data are retained in the buffer 114 and there are 17 pieces of data having a high priority, and it taking 46 ms to transfer all the pieces of data having a medium priority when there are 17 pieces of data having a medium priority among the 50 pieces of data. The predetermined time is set to 35 ms in consideration of there being 17 pieces of data having a high priority and 17 pieces of data having a medium priority in the buffer 114 being a considerably severe situation. Since the predetermined time depends on performance of the gateway ECU 110, the predetermined time may be set to a time of about 30 ms to about 40 ms.

Figure 6A:
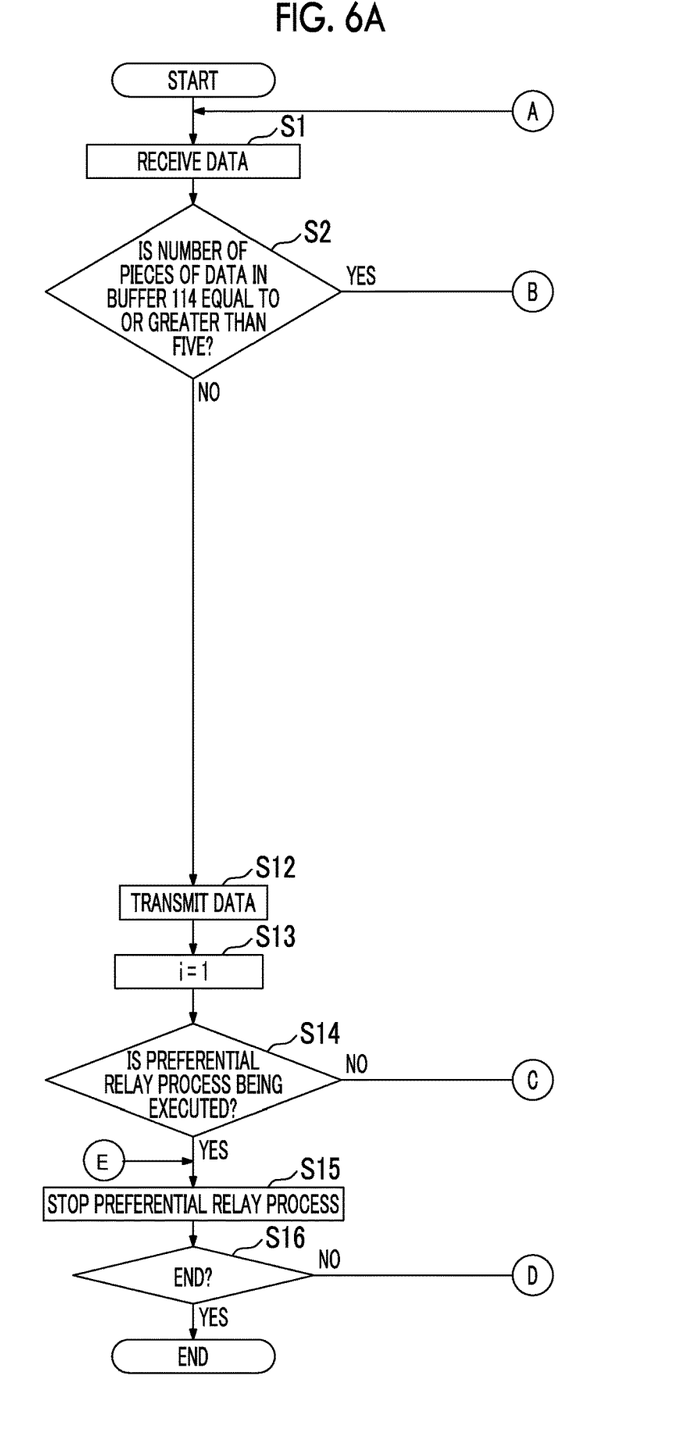
FIG. 6A is a diagram illustrating a process that is executed by the gateway ECU.
Figure 6B:
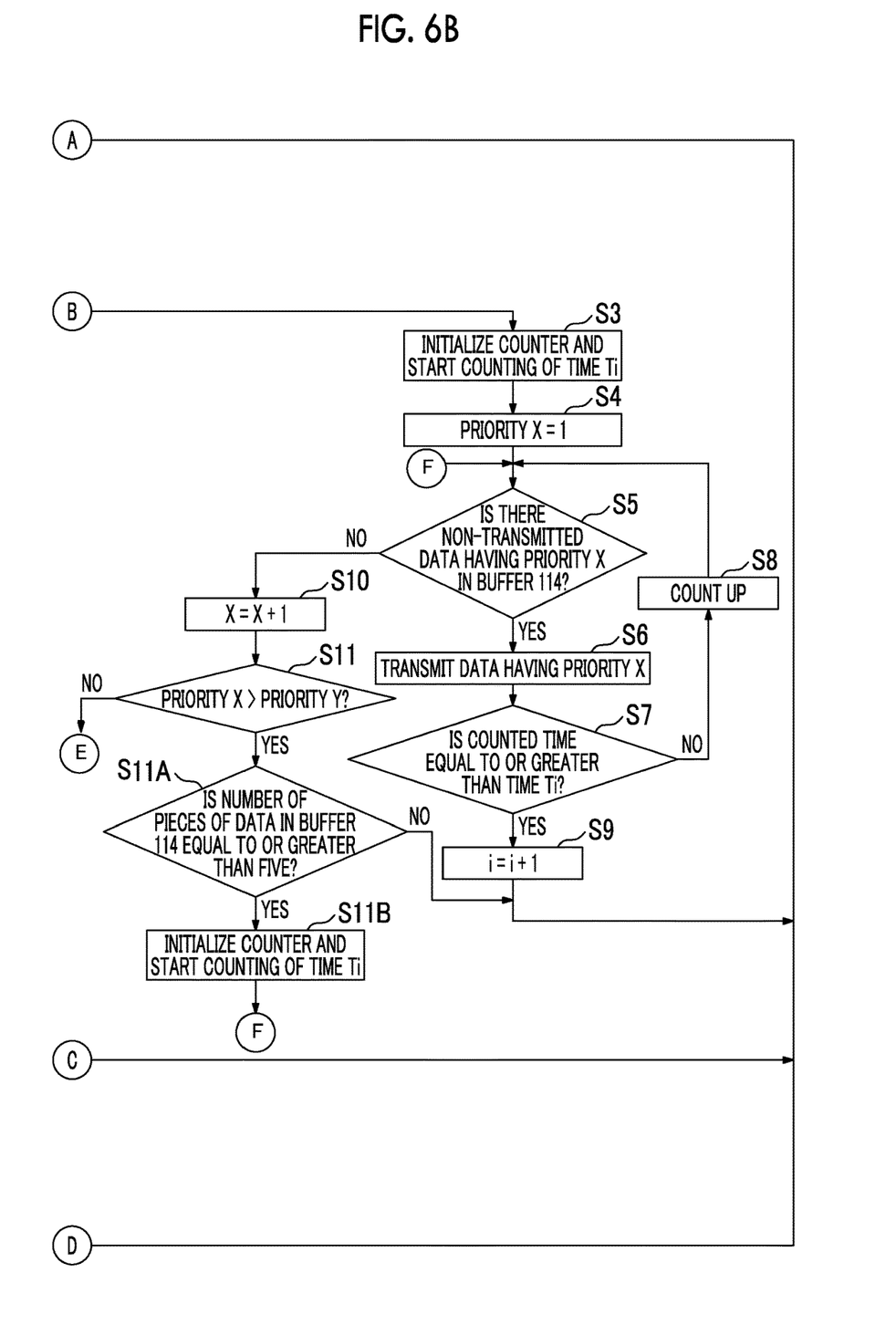
FIG. 6B is a diagram illustrating a process that is executed by the gateway ECU.

FIG. 6A and FIG. 6B are diagrams illustrating a process that is executed by the gateway ECU 110. The gateway ECU 110 executes the process illustrated in FIG. 6A and FIG. 6B for each predetermined control cycle.

The main controller 111 starts the process (START). The main controller 111, for example, starts the process when an ignition switch of the vehicle is turned on.

The relay 113 receives the data from the ECU (any one of 121 to 125) (step S1). When the relay 113 receives the data in step S1, the relay 113 sequentially stores the received data in the buffer 114. When no data is received in step S1, the relay 113 does not perform the process in step S1.

The retention determiner 112 determines whether the number of pieces of data in the buffer 114 is equal to or greater than five (step S2). When the number of pieces of data in the buffer 114 is equal to or greater than five, the retention occurs.

When the retention determiner 112 determines that the number of pieces of data in the buffer 114 is equal to or greater than five (S2: YES), the main controller 111 initializes a counter and starts counting of a time Ti (step S3). The counter that starts counting in step S3 is a counter that counts a time at which the data having a high priority or a medium priority is preferentially transmitted (hereinafter, a preferential time), and included in the main controller 111.

The preferential time extends twice in a case where the data having a high priority or a medium priority is not transmitted within the preferential time and the data having a high priority or a medium priority is retained in the buffer 114. The preferential time is first set to Tp1, and is set to Tp2 once the preferential time is extended. Then, when the preferential time extends once more (twice), the preferential time is set to Tp3. Tp1, Tp2, Tp3 are examples of a first time, a second time, and a third time, respectively.

Here, a value i of the time Ti counted by the main controller 111 has one of values 1, 2 and 3. For example, the lengths of T1, T2, T3 are the same as one another and are all 1 ms. An initial value of the value i is one.

The time Ti and the preferential times Tp1, Tp2, Tp3 have a relationship of Tp1=T1, Tp2=T1+T2, and Tp3=T1+T2+T3. That is, the preferential time Tp1 is 1 ms, Tp2 is 2 ms, and Tp3 is 3 ms.

In a case where the data having a high priority or a medium priority in buffer 114 cannot be transmitted during the preferential time Tp1, the preferential time extends to the preferential time Tp2. When the preferential time extends once more (twice), the preferential time is set to Tp3. The extension of the preferential time Tp1 to Tp2 or Tp3 is performed by adding T2 or T2 and T3 to Tp1.

The main controller 111 sets a priority X to one (step S4). Priority X=1 is associated with the value "1111" indicating a high priority of the frame described above.

The relay 113 determines whether there is non-transmitted data having the priority X in the buffer 114 (step S5). This is intended to preferentially transmit non-transmitted data having a high priority when there is the non-transmitted data having a high priority.

When the relay 113 determines that there is the non-transmitted data having the priority X in the buffer 114 (S5: YES), the relay 113 transmits one piece of the data having the priority X among pieces of the non-transmitted data stored in the buffer 114 (step S6).

The main controller 111 determines whether the time counted by the counter is equal to or greater than the time Ti (ms) (step S7). As described above, the time T1 is 1 ms, the time T2 is 2 ms, and the time T3 is 3 ms. In step S7, the time Ti determined by the value i is compared with the time counted by the counter of the main controller 111.

The main controller 111 determines that the time counted by the counter is not equal to or greater than the time Ti (ms) (S7: NO), the main controller 111 counts up (step S8). The main controller 111 counts a time elapsed after the start of counting by the counter by counting up.

When the main controller 111 ends the process of step S8, the main controller 111 causes the flow to return to step S5. As a result, when there is the non-transmitted data having the priority X in the buffer 114, the data having the priority X is transmitted in step S6.

When the main controller 111 determines that the time counted by the counter is equal to or greater than the time Ti (ms) (S7: YES), the main controller 111 increments the value i of the time Ti (step S9). This is intended to extend the time Ti.

When the main controller 111 ends the process of step S9, the main controller 111 causes the flow to return to step S1.

Further, in step S5, when the relay 113 determines that there is no non-transmitted data having the priority X in the buffer 114 (S5: NO), the main controller 111 increments the priority X (step S10). That is, in a case where priority X=X+1 and the priority X before the increment is one, the priority X becomes two. Priority X=2 is associated with the value "0011" indicating the medium priority of the above-described frame.

The main controller 111 determines whether the priority X is higher than a priority Y (step S11). The priority Y indicates a lowest priority. Here, the lowest priority Y is Y=3 and corresponds to the value "0000" indicating the low priority of the frame described above.

When the main controller 111 determines that the priority X is higher than the priority Y (S11: YES), the retention determiner 112 determines whether the number of pieces of data in the buffer 114 is equal to or greater than five (step S11A). Step S11A is a determination process that is the same as step S2.

When the retention determiner 112 determines that the number of pieces of data in the buffer 114 is equal to or greater than five (S11A: YES), the main controller 111 initializes the counter and starts counting of the time Ti (step S11B). Step S11B is the same as step S3. When the main controller 111 ends the process of step S11B, the main controller 111 causes the flow to return to step S5. This is intended to return to step S5 and continue step S5 and subsequent processes since the priority X in this case corresponds to the medium priority.

Further, when the main controller 111 determines that the priority X is not higher than the priority Y (S11: NO), the flow proceeds to step S15. A case where the main controller 111 determines in step S11 that the priority X is not higher than the priority Y is a case where the priority X is the same as the priority Y and is a low priority. That is, the case is a case where the data stored in the buffer 114 is only data having a low priority. In such a case, the main controller 111 causes the flow to proceed to step S15 in order to stop the preferential relay process.

The main controller 111 stops the preferential relay process (step S15). This is because the data stored in the buffer 114 is only the data having a low priority.

The main controller 111 determines whether a series of processes end (step S16). The main controller 111 determines that the processes end, for example, when the ignition switch of the vehicle is turned off.

When the main controller 111 determines that the processes end (S16: YES), the main controller 111 ends the series of processes (END). The main controller 111 ends the processes, for example, when the ignition switch of the vehicle is turned off. When the main controller 111 determines that the processes do not end (S16: NO), the main controller 111 causes the flow to return to step S1.

Further, when the retention determiner 112 determines in step S11A that the number of pieces of data in the buffer 114 is not equal to or greater than five (S11A: NO), the main controller 111 causes the flow to return to step S1. This is intended to return to step S1 and continue step S2 and subsequent processes since the priority X in this case corresponds to the medium priority.

Further, when the retention determiner 112 determines in step S2 that the number of pieces of data in the buffer 114 is not equal to or greater than five (S2: NO), the relay 113 transmits the data stored in the buffer 114 (step S12). Through the process in step S12, the data stored in the buffer 114 is transmitted to the ECU (any one of 121 to 125) that is a transmission destination in an order of storage (sequentially from oldest data) regardless of the priority.

The main controller 111 sets the value i of the time Ti to one (step S13). This is intended to set the value of the time T1 in step S3 in a case where five or more pieces of data are retained in the buffer 114 and the flow proceeds from step S2 to step S3 later. This is also intended to reset the value i of the time Ti to one in step S13 in a case where the flow proceeds from step S2 to step S12 after steps S3 to S9 are executed and the value i of the time Ti is two or three.

The main controller 111 determines whether the preferential relay process is being executed (step S14). A case where the flow proceeds from step S2 to S12, S13, and S14 is a case where the preferential relay process is not needed to be performed. This is intended to reset a flag for the preferential relay process to "0" when the flag for the preferential relay process is "1" indicating execution in such a case.

When the main controller 111 determines that the preferential relay process is being executed (S14: YES), the main controller 111 stops the preferential relay process (step S15). This is because the preferential relay process is not needed to be performed. When the process of step S15 ends, the main controller 111 causes the flow to proceed to step S16.

Further, when the main controller 111 determines that the preferential relay process is not being executed (S14: NO), the main controller 111 causes the flow to return to step S1. This is intended to continue the process of each step from step S1 again since the preferential relay process is not being executed and the flag is not needed to be reset.

As described above, the gateway ECU 110 executes the flow illustrated in FIG. 6A and FIG. 6B, and executes the preferential relay process when the data is retained in the buffer 114.

As described above, according to the in-vehicle network system 100 of the embodiment, when the data is retained in the buffer 114, data having a priority higher than a predetermined priority is preferentially relayed such that the data reaches the ECU (any one of 121 to 125) that is a transmission destination within a predetermined time. The predetermined time is a time that is set such that various controls of the vehicle are not affected.

Accordingly, it is possible to prevent the retention of the data having a priority higher than a predetermined priority among the data transferred from the ECU (any one of 121 to 125) to another ECU (any one of 121 to 125) via the gateway ECU 110. Further, relay is performed such that data having a priority higher than a predetermined priority reaches the ECU (any one of 121 to 125) that is a transfer destination (a transmission destination) within a predetermined time set such that various controls of the vehicle are not affected.

Thus, it is possible to provide the in-vehicle network system 100 capable of preventing both retention of transfer data and delay of transfer of data.

Further, it is conceivable to increase a bandwidth of the VLAN 130 (the communication lines 131 to 135) in order to prevent the retention of the transfer data, but increasing the bandwidth of the VLAN 130 is costly. The retention of the data can be prevented when the bandwidth of the VLAN 130 is increased, but in a case where no retention of data occurs, the bandwidth is wide more than needs and this is not efficient.

On the other hand, since the in-vehicle network system 100 efficiently relays data having a priority higher than a predetermined priority when retention of data occurs without particularly increasing the bandwidth of the VLAN 130, it is possible to achieve high efficiency of the system and suppression of a cost increase.

The aspect in which the gateway ECU 110 that performs the data transfer process using the L7 switch is used as a relay device has been described above. However, the data transfer process may be performed using an L3 switch that performs switching in software as a relay device in place of the gateway ECU 110.

The L3 switch is a switch that has a mechanism for distributing a transmission destination address of a packet in layer 3 (network layer) in an OSI reference model, and performs switching in software. In the L3 switch, an Internet Protocol (IP) is used as a transfer protocol.

Further, although an aspect in which the gateway ECU 110 includes the retention determiner 112 has been described above, the retention determiner 112 may be provided outside the gateway ECU 110. In this case, the retention determiner 112 provided outside the gateway ECU 110 may count the number of IDs of data stored in the buffer 114 to detect the number of pieces of data, and determine whether retention of data occurs.

Further, an aspect in which the lengths of the time Ti (T1, T2, T3) counted by the main controller 111 are the same as one another and are all 1 ms, the preferential time Tp1 is 1 ms, Tp2 is 2 ms, and Tp3 is 3 ms has been described above. However, the lengths of the time Ti (T1, T2, T3) counted by the main controller 111 may be different from one another. For example, when T1, T2, T3 are 2 ms, 1.5 ms, and 1 ms, respectively, the preferential time Tp1 is 2 ms, Tp2 is 3.5 ms, and Tp3 is 4.5 ms. Settings of T1, T2, T3 (2 ms, 1.5 ms, and 1 ms) may be performed in steps S3 and S9.

Further, an aspect in which the retention determiner 112 counts the number of IDs of the data stored in the buffer 114 to detect the number of pieces of data, and determines that the retention of the data occurs when the number of pieces of data stored in the buffer 114 is equal to or greater than five has been described. However, the retention determiner 112 may determine whether the retention of the data occurs by detecting a free space in the buffer 114 instead of counting the number of pieces of the data stored in the buffer 114.

Further, although the aspect in which the retention of the data is determined to occur when the number of pieces of the data stored in the buffer 114 is equal to or greater than five has been described, the retention of the data may be determined to occur when the number of pieces of data stored in the buffer 114 is equal to or greater than two. Thus, the number of pieces of data when the retention of the data is determined to occur may be set according to, for example, performance of the in-vehicle network system 100, and the number may be any number as long as the number is equal to or greater than two.

Further, a time for which the data is stored in the buffer 114 may be detected instead of counting the number of pieces of data stored in the buffer 114, and retention of data may be determined to occur in a case where the data is stored for a predetermined time or more. The time for which the data is stored in the buffer 114 may be recognized, for example, by specifying each piece of data using an ID and measuring a difference between a time at which the data is stored in the buffer 114 and a time at which the data is transmitted from the buffer 114. The predetermined time in this case is an example of a second predetermined time and may be set to, for example, 10 ms.

Further, the priority of the data as illustrated in FIG. 3 may vary according to an operating state of the vehicle. For example, when a vehicle cabin temperature is high immediately after the engine starts, a priority of a driving vibration of an air conditioner may be set to high, and when the vehicle cabin temperature becomes equal to or less than a predetermined temperature, the priority of the driving vibration of the air conditioner may be changed to medium. In such a case, the gateway ECU 110 may change and register the priority of the driving vibration of the air conditioner in the data in a table format of FIG. 3.

Further, although an aspect in which the in-vehicle network system 100 includes one gateway ECU 110 has been described above, the in-vehicle network system 100 may include a plurality of gateway ECUs 110 and the preferential relay process may be executed in each gateway ECU 110.

The in-vehicle network system of an exemplary embodiment of the present disclosure has been described, but the present disclosure is not limited to the specifically disclosed embodiment, and various modifications or changes can be made without departing from the appended claims.

What is claimed is:

1. An in-vehicle network system, comprising: a plurality of controllers; a plurality of communication lines connected to the plurality of controllers, respectively; a relay device connected to the plurality of controllers via the communication lines; and a retention determining controller configured to determine whether retention of data occurs in the relay device, wherein: the relay device is configured to relay data between the communication lines, and configured to preferentially relay data having a priority equal to or higher than a predetermined priority such that the data reaches one of the plurality of controllers that is a transmission destination among the plurality of controllers within a first predetermined time when the retention determining controller determines that the retention occurs; and the retention determining controller is configured to determine whether the retention of the data occurs according to whether a number of pieces of the data retained in the relay device is equal to or greater than a predetermined number or whether a time for which the data is retained in the relay device is equal to or longer than a second predetermined time.

2. The in-vehicle network system according to claim 1, wherein the relay device is configured to preferentially relay the data having the priority equal to or higher than the predetermined priority to the one of the plurality of controllers that is the transmission destination for a first time shorter than the first predetermined time when the retention determining controller determines that the retention occurs.

3. The in-vehicle network system according to claim 2, wherein the relay device is configured to extend the first time to a second time shorter than the first predetermined time and longer than the first time when the retention determiner determines that the retention occurs at a time of elapse of the first time.

4. The in-vehicle network system according to claim 1, wherein the relay device includes a buffer that stores the data.

5. The in-vehicle network system according to claim 4, wherein the retention determining controller is configured to determine whether the retention of the data occurs by detecting a free space of the buffer.

6. The in-vehicle network system according to claim 1, wherein the relay device is configured to relay data having a priority lower than the predetermined priority after the relay device preferentially relays the data having the priority equal to or higher than the predetermined priority.

7. The in-vehicle network system according to claim 1, wherein the first predetermined time is a time that is needed for control of a vehicle.

8. The in-vehicle network system according to claim 1, wherein the priority of the data includes three steps of high, medium, and low, and the priority of the data associated with travel of a vehicle is high.

9. The in-vehicle network system according to claim 8, wherein:
   a priority of data of a drive recorder or data indicating a set temperature of an air conditioner is medium; and
   a priority of data indicating opening and closing of a power window, unlocking and locking of an electronic lock, and opening and closing of a door is low.

10. The in-vehicle network system according to claim 1, wherein the priority of the data is set after a header area of a data frame and before a data area of the data frame.

11. A method for communicating data in an in-vehicle network system including a plurality of controllers, a plurality of communication lines connected to the plurality of controllers, respectively, a relay device connected to the plurality of controllers via the communication lines, and a retention determining controller configured to determine whether retention of data occurs in the relay device, the method comprising:
   relaying data between the communication lines;
   determining whether retention of the data occurs according to whether a number of pieces of the data retained in the relay device is equal to or greater than a predetermined number or whether a time for which the data is retained in the relay device is equal to or longer than a second predetermined time;
   preferentially relaying data having a priority equal to or higher than a predetermined priority such that the data reaches one of the plurality of controllers that is a transmission destination among the plurality of controllers within a first predetermined time when the retention determining controller determines that the retention occurs.

12. An in-vehicle network system, comprising: a plurality of controllers; a plurality of communication lines connected to the plurality of controllers, respectively; a relay device connected to the plurality of controllers via the communication lines; and a retention determining controller configured to determine whether retention of data occurs in the relay device, wherein the relay device is configured to:
   relay data between the communication lines, and configured to preferentially relay data having a priority equal to or higher than a predetermined priority such that the data reaches one of the plurality of controllers that is a transmission destination among the plurality of controllers within a first predetermined time when the retention determining controller determines that the retention occurs;
   preferentially relay the data having the priority equal to or higher than the predetermined priority to the one of the plurality of controllers that is the transmission destination for a first time shorter than the first predetermined time when the retention determining controller determines that the retention occurs;
   extend the first time to a second time shorter than the first predetermined time and longer than the first time when the retention determining controller determines that the retention occurs at a time of elapse of the first time; and
   extend the second time to a third time shorter than the first predetermined time and longer than the second time when the retention determining controller determines that the retention occurs at a time of elapse of the second time.

* * * * *